June 29, 1971  M. TERKEL ET AL  3,588,965
INSULATED PIPELINE JACKETING SYSTEMS
Original Filed April 6, 1966  2 Sheets-Sheet 1
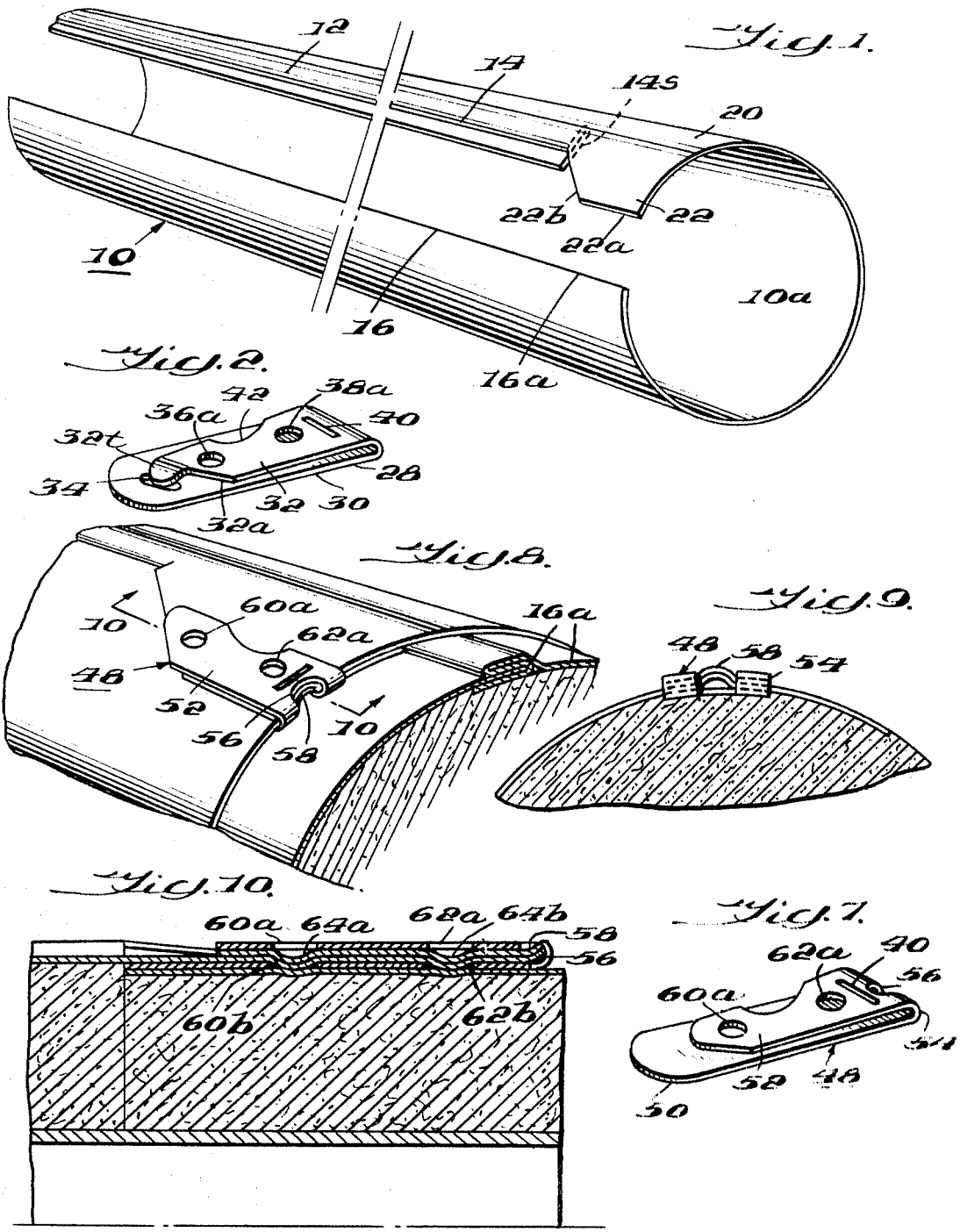
INVENTORS
MIKE TERKEL,
SHELDON M. ROSE,
FRED R. SMYLIE,
BY J. Harold Kilcoyne
ATTORNEY

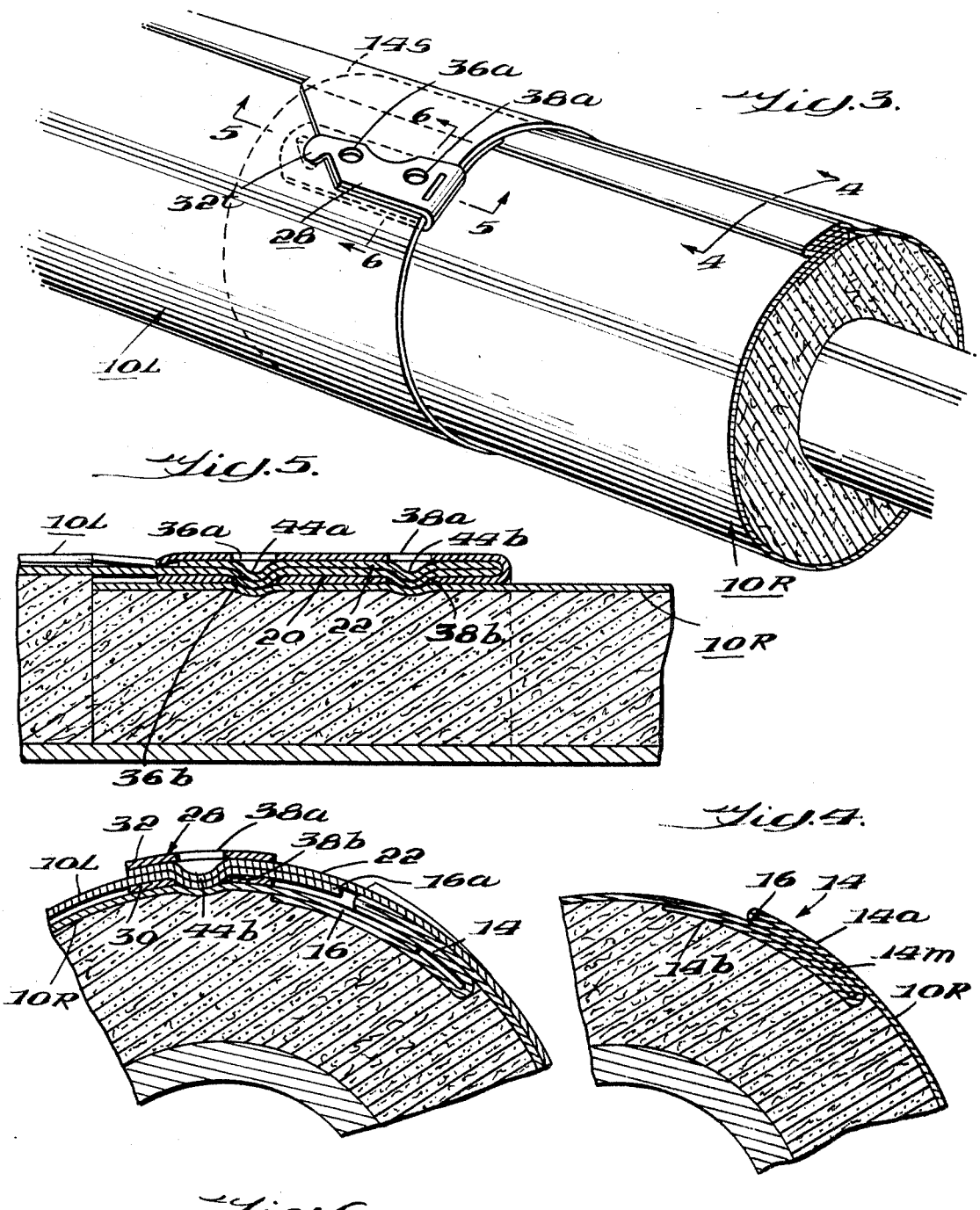

United States Patent Office 3,588,965
Patented June 29, 1971

3,588,965
INSULATED PIPELINE JACKETING SYSTEMS
Mike Terkel, Beachwood, and Sheldon M. Rose, Lynhurst, Ohio, and Fred R. Smylie, Van Nuys, Calif., assignors to Ultronix, Inc., New York, N.Y.
Original application Apr. 6, 1966, Ser. No. 540,682, now Patent No. 3,486,534, dated Dec. 30, 1969. Divided and this application June 6, 1969, Ser. No. 844,235
Int. Cl. B65d *63/06;* F16l *9/14*
U.S. Cl. 24—23                    3 Claims

ABSTRACT OF THE DISCLOSURE

A spring-metal generally U-shaped clip for use in clipping together two ends of a jacket surrounding an insulated pipe, of which one jacket end is formed as a circumferentially extending tab adapted to overlie the other jacket end, said tab being defined by a straightway, axially extending side edge and an inner-end edge inclined by an approximate 45° angle to said axially extending side edge, said clip having a long leg and a short leg, the long leg having length such that it is adapted to underlie both said ends of the jacket and the short leg having length and inner-edge configuration corresponding to said side and inner-edge configuration of the tab, said clip arms being provided with at least one set of aligned holes through which the overlying-underlying portions of the jacket ends circumscribed by said holes may be forced thereby to function as a locking key.

---

This application is a division of application Ser. No. 540,682, filed Apr. 6, 1966, and now Pat. No. 3,486,534, issued Dec. 30, 1969.

This invention relates in general to insulated pipeline jacketing systems and more particularly to improvements in the structure of both the individual jacketing sections and the jacket fasteners, as effects an improved insulated pipeline jacketing system as herein proposed.

Among the objects of this invention may be noted: the provision of a jacketing system for insulated pipelines which, compared to prior jacketing systems employing rolled jacketing material which is cut and fitted on the site, may be more simply and readily installed and is more economical in that it does away with the requirement for storage space at the site, the cost of shipment of heavy cutters and rollers to and of cutting and rolling the jacketing after installation; the provision of an improved jacketing system as aforesaid which, as compared to jacketing systems employing known metal lock-on type jackets, is simpler and less costly to install, has cleaner appearance in that it does away with unsightly butt straps which, in a system using conventional jackets, are applied approximately every three feet, and which can be more readily maintained due to the removability of individual jackets or jacket sections of the overall jacketing system without damaging same as permits their re-use; the provision of an insulated pipeline jacketing system whose construction is such that it requires no strapping or end sealing; the provision of an insulated pipeline jacketing system made up of prefabricated jacket sections and fasteners which are so constructed and arranged as to be capable of fast and economical installation on existing pipeline insulation and which, when installed as intended provide a weatherproof jacketing thereon characterized by a smooth, finished appearance; and the provision of an insulated pipeline jacketing system as aforesaid wherein, after use, the individual jacket sections may be readily removed for inspection and/or maintenance of the insulation and/or pipeline and thereupon easily replaced for re-use.

The above and other objects and features of advantage of an insulated pipeline jacketing system and its components according to the present invention will be apparent from the following detailed description thereof, in which reference is had to the accompanying illustrative drawings, wherein:

FIG. 1 is a broken-away perspective view of a prefabricated jacket section of the type employed in an insulated pipeline jacketing system as herein proposed;

FIG. 2 is a perspective view of one form of clip-type fastener employed in fastening the meeting edges of each fastener section together at the end thereof which overlaps the relatively opposite end of a previously installed jacket;

FIG. 3 is an enlarged, broken-away perspective view illustrating the manner of installation of jacket sections as shown in FIG. 1 in end-overlapping relationship to one another and of positively securing the meeting edges of each jacket section together at its overlapping end following its installation on a previously installed jacket section as aforesaid through use of a clip-type fastener shown in FIG. 2;

FIGS. 4, 5 and 6 are broken-away sections taken on lines 4—4, 5—5 and 6—6 of FIG. 3;

FIG. 7 is a perspective view showing a variant form of fastener clip from that according to FIG. 2;

FIG. 8 is a broken-away perspective view illustrating the manner of positively securing the meeting edges of each jacket section together at its overlapping end portion made possible by the FIG. 7 form of clip;

FIG. 9 is an end view of the fastening shown in FIG. 8; and

FIG. 10 is a section through the fastening taken on line 10—10 of FIG. 8.

Referring to the drawings in greater detail, a jacketing system according to the present invention comprises a plurality of individual, prefabricated wrap-around jacket sections (hereinafter for convenience called "jackets") of identical construction and configuration which are adapted to be installed on an existing insulated pipeline to be jacketed by closing same in succession about and in end-overlapping relation to one another along said pipeline, in manner such that they together form a substantially smooth and effective continuous protective wrapping about said pipeline and its insulation, in conjunction with a plurality of fastener clips, one for each jacket, for positively securing the meeting edge portions of each such jacket to one another at the end thereof which overlaps the lapped end of each previously applied jacket, thus providing an effective weather seal between overlapping and lapped jacket ends.

More particularly, the individual jackets as supplied to the site are, according to the invention, prefabricated to the structure and configuration corresponding to that shown in FIG. 1. That is to say, each jacket designated 10 comprises an elongated, generally rectangular sheet of light-weight weather-resistant metal, such as aluminum, which is preferably internally faced with a specially treated kraft paper facing 10a which serves as a moisture barrier between the aluminum of the jacket and the surface of the pipeline insulation to be covered thereby. As indicated in FIG. 1, the sheets are factory-rolled about an axis extending lengthwise thereof to a curled or open-wrap configuration, and does away with the necessity of any rolling at the site of installation.

As supplied, each curled or open-wrap jacket 10 is formed along one of the longitudinal edges of its jacket portion proper (designated 12) with a so-called Z-lock designated 14 and which is adapted to lockingly receive the opposite plain longitudinal edge 16 of the jacket which extends straightway for the full jacket length upon said opposite edge being slipped into the Z-lock during installation. As best seen in FIG. 4, the Z-lock 14 is formed by bending the longitudinal edge portion of the sheet back and under on itself (as at 14a) along a longitudinal line which is set back a substantial distance from its edge proper and then bending said bent-under portion forwardly and again under on itself (as at 14b) so that it has Z-section. By virtue of such section, the folded back and under portion 14a and the folded forward and under portion 14b define a longitudinally running, open mouth 14m positioned to receive the opposite longitudinal plain edge 16 of the sheet when the latter is brought during installation to a position such that it will enter said mouth.

By design, the opening to the mouth 14m, while sufficiently wide at its entrance end as to permit ready insertion of the opposite plain edge 16 of the jacket therein, is gradually restricted inwardly so that, as insertion of said opposite plain edge proceeds, the latter is held with substantial friction and thus the Z-lock 14 functions as a friction-type lock seam which holds the meeting edges of the jacket closed after they have been brought together during installation.

It is a further important feature of the present invention that the curled jackets 10 as prefabricated and supplied each has length about 2″ greater than the length of the pipeline insulation about which its jacket proper 12 is to wrap (for example, a jacket 10 whose jacket proper or body is 36″ is fabricated to a 38″ length); and further that said two-inch extra length section is specially configured so as to function as a jacket securing and sealing extension on each jacket proper. Such a jacket extension designated 20 is shown in FIG. 1 and it will also be observed from this view that, whereas the longitudinal plain edge 16a thereof corresponding to the edge 16 of the jacket proper extends in continuation of said edge 16, the corresponding edge of the extension portion is not only devoid of the Z-lock formation 14, but also it is configured so as to form a circumferentially extending tab 22 of arcuate length such that when the edge 16 of the jacket proper is cooperated with the Z-lock 14, said tab will extend a substantial distance over onto the opposite edge portion of said extension 20 defined by the extended edge 16a. Illustratively, the inner or top edge 22b of the tab which connects the longitudinal edge 22a of said tab with the longitudinal Z-lock defined edge of the jacket proper inclines at an angle of approximately 45° to said longitudinal edges.

At this point of the description, it is noted that, consequent to the extension portion 20 extending axially or longitudinally beyond the Z-lock formation 14, the terminating end edge of the latter in effect defines an internal shoulder 14a which renders jackets of the invention self-gauging when being installed, as will be hereinafter more fully explained.

As forecast above, the invention utilizes fastener clips rather than straps or bands to secure the meeting edges of the overlapping end portions of the jackets to one another. One form of fastener clip (designated 28) employed for this purpose is shown in FIG. 2 to comprise a flat, relatively wide strip of stainless steel bent to U-shape along a transverse line of bend disposed closer to one than to the other of the strip, whereby one arm, i.e. the under arm 30, of the clip has somewhat greater length than the other (outer) arm 32. Illustratively, the length of the under arm 30 is somewhat greater than the longitudinal dimension of the aforesaid tab 22 provided on the jacket extension, as measured along the tab edge 22a, whereas the length of the outer arm 32 of the clip corresponds to that of said longitudinal dimension of said tab portion extending along its said edge 22a. More particularly, the free end edge 32a of the clip arm 32 is inclined to the longitudinal clip center line by the same angle that the tab edge 22b bears to the tab edge 22a whereby, when the clip is slipped over the tab 22 in lateral position such that the shorter-length side edge of the arm 32 coincides with the longitudinal tab edge 22a, the free-end edge 32a of the clip arm 32 will coincide with the inclined edge 22b of the tab.

Preferably also, said free-end edge 32a of the clip arm 32 is formed with a downwardly inclined tongue 32t which extends at the same inclination as that of said free-end edge proper and hence as that of the tab edge 22b, and the under arm 30 of the clip is provided with an inclined slot 34 serving normally to accommodate said tongue. Such arrangement of clip-arm edge 32a and tongue 32t thereon provides that when the clip 28 is applied as in FIG. 3, the tongue will abut the inclined edge 22b of the jacket extension tab 22, thus to hold the clip in proper position with respect to said tab.

The maximum spacing between the under and outer arms 30, 32, respectively, of the clip is approximately that of two thicknesses of the aluminum sheet from which the jackets are fashioned, but said arms are initially biased to relative positions such that their free ends are more closely spaced than are their connected or bight ends, and thus the free-end spacing between the arms is such that the downwardly offset tongue 32t of the upper clip arm normally projects into the slot 34 of the under arm 30.

The fastener clips 28 are also unique in the feature that both arms 30, 32 thereof are provided with sets of aligned holes designated 36a, 36b and 38a, 38b, which are best seen in FIG. 4. The purpose of said holes is to permit "dimpling" of the jacket parts to which the clips is applied, i.e. the tab 22 and underlying extension portion, in the area of said parts circumscribed by said holes, as effects positive securement of said parts.

If desired, the upper arm 32 of the clip may be provided in its bight end portion with a transverse slot 40 with which the blade of a screw driver or similar tool may engage during clip application, and said arm may also be provided with an arcuate cut-out 42 in one edge, which facilitates spreading of the clip arms either manually or through the use of a bladed tool.

The manner of using a clip 28 as described will, it is believed, be clear from a consideration of FIG. 3 in particular, taken with FIGS. 5 and 6. It should be understood, however, that prior to actually applying a clip, the jacket to which it is to be applied (designated 10L, FIG. 3) will have been properly related to a just previously installed jacket (designated 10R) by being first wrapped, although not completely closed on, the insulated pipeline at a length portion immediately adjacent said previously installed jacket 10R and thereupon, after first disposing its extension portion 20 so that it makes an initial overlap with the adjacent end of the jacket 10R, slid along said pipeline until the end of its Z-lock formation 14 abuts the lapped end edge of said jacket 10R, which engagement determines the amount that the jacket 10L can overlap the jacket 10R; and that thereupon the jacket 10L will have been properly oriented with respect to said previously installed jacket 10R by lining up its Z-lock formation with that of the jacket 10R; and finally will have been closed on the insulated pipeline by forcing its longitudinal plain edge 16 as far as it will go into the mouth 14m of said lock formation. When these jacket installation requirements have been satisfied, a clip 28 may now be applied to the jacket 10L as shown in FIG. 3. More particularly, after first positioning the clip so that the shorter side edge of its upper arm 32 lines up with the longitudinal edge 22a of the tab of jacket 10L, it is applied by inserting the free end of its lower (and longer) arm 30 into the crevice extending between the jacket extension 20 thereof and the surface of the jacket 10R now lapped thereby and then, with the clip arm 32 held raised from the tab 20 which it overlies, bodily pushing the clip in the direction of the axial length of said jacket 10L until its bight end engages the end edges of tab 20 and the opposite edge portion of the jacket extension lapped by said tab, whereupon the upper arm 32 of the clip is permitted to lower against the outer surface of said tab. When the clip has been pushed to its final position shown in FIG. 2, its arms embrace between them both the tab 22 and the opposite edge portion of the jacket extension which is lapped by said tab, i.e. two thicknesses of the same jacket. Furthermore, when the clip is in its final position as aforesaid, the downwardly offset tongue 32t provided at the free end of the upper clip arm 32 will lower against the inclined top edge 22b of the tab embraced between the clip arms, and thus said tongue serves to hold the clip in place prior to its final securement.

In a final securing operation, the metal of said two thicknesses, i.e. tab and underlying opposite edge portion of the jacket extension, is "dimpled" in the areas thereof circumscribed by the aforesaid holes 36a, 36b and 38a, 38b provided in the clip arms. By "dimpling," as used herein, is meant such deformation of the metal of the tab and underlying extension 16a as takes place when the blunted point of a punch or like tool having diameter such as to be readily insertible in said holes and which has been placed in contact with the areas of the tab 20 showing through the holes of the clip arm 32 is forcefully struck with a hammer or like tool. Such results in both thicknesses of the metal circumscribed by said clip-arm holes being dimpled, i.e. depressed, so as to form locking keys 44a, 44b, as generally shown in FIG. 5, which keys function not only to secure the tab 22 to the underlying portion or thickness of the jacket extension as insures against jacket opening but also to secure the clip in fixed position with respect to the tab and to some degree also, depending on the depth of the dimples or keys, secures the jacket 10L against unwanted axial or circumferential movement with respect to said previously installed jacket 10R.

As distinguished from the FIG. 2 form of clip, the modified clip 48 shown in FIG. 7 does away with the downwardly offset tongue 32t and substitutes therefor a different and less expensive preliminary holding clip-to-tab holding means. More particularly, said modified clip 48 has U-configuration and comprises flat arms 50, 52 (corresponding generally to the arms 30, 32 of the FIG. 2 form of clip) which extend from a U-bent or bight portion designated 54. As best seen in FIG. 8, said bight portion is formed with a crescent-shaped notch or cut-out 56 which, when the clip is applied as in FIG. 8, opens towards the previously installed jacket 10R and exposes corresponding edge areas of both the tab 22 and the underlying extension portion 16a of the jacket 10L. According to the invention, these exposed edge portions of the two thicknesses of the jacket 10L are turned or peened upwardly by a suitable tool inserted between the clip notch 56 and the underlying surface of the jacket 14R, thus to form a bight-end locking key 58 serving to secure the clip against both lateral shifting movement and axial separating movement with respect to the jacket parts embraced by the clip.

Referring to FIG. 10 in particular, it will be understood that the arms of the modified clip 48 are also provided with aligned holes 60a, 60b and 62a, 62b for effecting "dimpling" of the two thicknesses of the same jacket thereof circumscribed by the holes, as results in the formation of jacket-edge securing keys 64a, 64b corresponding to the aforementioned keys 44a, 44b, shown in FIG. 5.

Without further analysis, it will be appreciated that an insulated pipeline jacketing system and the parts making up same, as herein described and illustrated, achieves the objectives of the invention as earlier set forth in effective, practical and thoroughly dependable manner. However, as many changes could be made in carrying out the above constructions without departing from the scope of the invention, it is intended that all matter contained in the above description or shown in the accompanying drawings shall be interpreted as illustrative and not in a limiting sense.

We claim:

1. A clip-type fastener for securing the end edge portions of an insulated pipeline jacketing section one to the other and in close overlying-underlying relation, of which one said end-edge portion is in the form of a circumferentially extending tab which laps over the other end-edge portion and is defined in part by a straightway, axially extending edge and an inner-end edge which is inclined by an approximate 45° angle to said axially extending edge, said clip comprising a relatively wide, flat strip of metal bent to U-form along a line of bend closer to one end thereof than to the other, whereby one clip arm has appreciably greater length than the other and said arms being spaced apart a distance substantially equal to the combined thickness of said end-edge portions of the jacketing section, the longer clip arm being adapted to underlie and the shorter clip arm being adapted to overlie said end edge portions, the shorter clip arm having length and one-side-edge and free-end edge configuration such that when the clip is applied the said side and free-end edges of the shorter clip arm will coincide with the straightway axially extending and inclined inner-end edges of the circumferentially extending tab, and said clip arms being provided with at least one set of aligned holes serving to circumscribe limited overlying-underlying areas of the end-edge portions of the jacketing section as permits deformation of said areas subsequent to the application of the clip.

2. A clip-type fastener according to claim 1, wherein a short-length portion of the free end edge of the shorter clip arm is extended beyond said inclined edge proper and is bent downwardly out of the plane of said clip arm to the form of a downwardly offset tongue which is adapted to abut said inclined inner-end edge of said tab.

3. A clip-type fastener according to claim 1, wherein the bight portion of the clip is provided with a cut-out extending into both said arms, thereby exposing limited circumferential-edge areas of said end-edge portions, as enables said exposed edge areas to be together deformed out of the respective planes of said end-edge portions to the form of end-edge locking keys.

References Cited

UNITED STATES PATENTS

| | | | |
|---|---|---|---|
| 190,641 | 5/1877 | Stouffer | 24—23W |
| 927,253 | 7/1909 | Lohsand | 138—167 |
| 1,601,832 | 10/1926 | Jackson | 24—259FCUX |
| 2,214,109 | 9/1940 | Ott | 24—23W |
| 3,000,433 | 9/1961 | Kemper | 138—149X |

FOREIGN PATENTS

| | | | |
|---|---|---|---|
| 1,037,674 | 8/1958 | Germany | 24—259FC |
| 854,528 | 11/1960 | Great Britain | 138—149 |

DONALD A. GRIFFIN, Primary Examiner

U.S. Cl. X.R.

138—149